(12) United States Patent
Miyabe et al.

(10) Patent No.: US 11,616,385 B2
(45) Date of Patent: Mar. 28, 2023

(54) VEHICLE BATTERY SYSTEM

(71) Applicant: Mazda Motor Corporation, Hiroshima (JP)

(72) Inventors: Takamori Miyabe, Aki-gun (JP);
Shigeki Kitamura, Aki-gun (JP);
Eitaro Tametani, Aki-gun (JP);
Wataru Masuda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 202 days.

(21) Appl. No.: 17/190,410

(22) Filed: Mar. 3, 2021

(65) Prior Publication Data

US 2021/0313824 A1 Oct. 7, 2021

(30) Foreign Application Priority Data

Apr. 1, 2020 (JP) .............................. JP2020-066087

(51) Int. Cl.
*H02J 7/14* (2006.01)
*H02J 7/00* (2006.01)
(Continued)

(52) U.S. Cl.
CPC .......... *H02J 7/1423* (2013.01); *B60R 16/033* (2013.01); *H01M 10/0525* (2013.01);
(Continued)

(58) Field of Classification Search
CPC ........ H02J 7/1423; H02J 7/00032; H02J 7/14; H02J 7/1469; H02J 7/00047; B60R 16/033; H01M 10/0525; H01M 10/425; H01M 10/441; H01M 10/46; H01M 2010/4271; H01M 2010/4278; H01M 2220/20; H01M 10/48; H01M 10/052; H01M 10/44; H01M 10/4221; Y02E 60/10; Y02T 10/70;
(Continued)

(56) References Cited

U.S. PATENT DOCUMENTS 6,844,634 B2 * 1/2005 Kobayashi .............. B60L 58/20
290/400
9,878,631 B2 * 1/2018 Hyde ........................ B60L 1/14
(Continued)

FOREIGN PATENT DOCUMENTS

CN 105480105 B * 10/2019 .......... B60L 11/1864
CN 107107772 B * 1/2020 .............. B60L 58/20
(Continued)

*Primary Examiner* — M Baye Diao
(74) *Attorney, Agent, or Firm* — Xsensus LLP

(57) ABSTRACT

A vehicle battery system configured to appropriately control a battery installed in a vehicle includes a controller and a rechargeable battery installed in the vehicle in a replaceable manner, charged by an electric power generator, and supplies electric power to auxiliary equipment of the vehicle. The controller determines whether a first battery or a second battery with charging efficiency lower than the first battery is installed in the vehicle as the rechargeable battery and, when determining that the second battery is installed as the rechargeable battery, makes the maximum generated power voltage that is the maximum value of the generated power voltage of the electric power generator higher than when determining that the first battery is installed.

16 Claims, 10 Drawing Sheets

(51) Int. Cl.
  *H01M 10/44*     (2006.01)
  *H01M 10/46*     (2006.01)
  *H01M 10/0525*   (2010.01)
  *B60R 16/033*    (2006.01)
  *H01M 10/42*     (2006.01)

(52) U.S. Cl.
  CPC ....... *H01M 10/425* (2013.01); *H01M 10/441* (2013.01); *H01M 10/46* (2013.01); *H02J 7/00032* (2020.01); *H01M 2010/4271* (2013.01); *H01M 2010/4278* (2013.01); *H01M 2220/20* (2013.01)

(58) Field of Classification Search
  CPC ......... Y02T 10/7072; B60K 6/28; B60L 1/00; B60L 53/80
  USPC ....................................................... 320/106
  See application file for complete search history.

(56) References Cited

U.S. PATENT DOCUMENTS

| | | | |
|---|---|---|---|
| 11,309,578 B2 * | 4/2022 | Koike | H02J 7/1423 |
| 11,394,213 B2 * | 7/2022 | Nook | H02J 7/0068 |
| 2019/0103629 A1 | 4/2019 | Koike et al. | |

FOREIGN PATENT DOCUMENTS

| | | | | |
|---|---|---|---|---|
| TW | 202015278 A | * | 4/2020 | ............. B60L 53/80 |
| WO | 2017/163959 A1 | | 9/2017 | |

* cited by examiner

VEHICLE BATTERY SYSTEM

CROSS-REFERENCE TO RELATED APPLICATION

This application claims priority from Japanese Application No. 2020-066087, filed on Apr. 1, 2020, the contents of which are incorporated by reference herein in its entirety.

TECHNICAL FIELD

The present disclosure relates to a vehicle battery system equipped with an electric power generator.

BACKGROUND

Conventionally, vehicles are equipped with a battery for supplying electric power to various types of auxiliary equipment and an electric power generator for charging the battery. For example, patent document 1 discloses a vehicle equipped with two batteries including a lithium ion battery and a lead battery (lead acid battery in patent document 1) as batteries and these two batteries are charged by electric power generators and supply electric power to auxiliary equipment.

PATENT DOCUMENTS

[Patent document 1] WO 2017/163959

SUMMARY

Unlike the vehicle in patent document 1, some vehicles are equipped with one rechargeable battery that is charged by receiving electric power from an electric power generator, supplies electric power to various types of auxiliary equipment, and can be replaced by the user. In such vehicles, the user may replace the rechargeable battery with a battery of a different type from the battery installed when the vehicle is shipped. Specifically, the lithium ion battery installed as the rechargeable battery when the vehicle is shipped may be replaced with another type of battery with charging efficiency lower than the lithium ion battery.

Here, in a lithium ion battery with high charging efficiency, when the generated power voltage of the electric power generator for charging this lithium ion battery is excessively high, this battery may be overcharged and damaged. In this case, by reducing the generated power voltage of the electric power generator in advance, damage to the battery can be prevented. However, when the generated power voltage of the electric power generator is simply lowered in the vehicle described above, if the user replaces the lithium ion battery with a battery with low charging efficiency as the rechargeable battery, the rechargeable battery may not be charged sufficiently in a short period and the charge amount may become insufficient.

The present disclosure addresses the problem described above with an object of providing a vehicle battery system that can prevent damage to the battery and insufficient charge amount of the battery regardless of the type of the battery installed.

To solve the problem described above, there is provided a vehicle battery system equipped with an electric power generator, the vehicle battery system including a rechargeable battery configured to be charged by the electric power generator and supply electric power to auxiliary equipment of a vehicle, the rechargeable battery being installed in the vehicle in a replaceable manner; and a controller configured to determine whether a first battery including a lithium ion battery or a second battery with charging efficiency lower than the first battery is installed in the vehicle as the rechargeable battery and, when determining that the second battery is installed as the rechargeable battery, make a maximum generated power voltage that is the maximum value of a generated power voltage of the electric power generator higher than when determining that the first battery is installed.

According to the present disclosure, it is determined whether the first battery including a lithium ion battery with high charging efficiency or the second battery with low charging efficiency is installed in the vehicle as the rechargeable battery and, when the rechargeable battery is the first battery, the generated electric power of the electric power generator is reduced. Accordingly, it is possible to prevent excessive electric power from being supplied from the electric power generator to the lithium ion battery and the lithium ion battery from being overcharged and eventually failed by this excessive electric power. When the rechargeable battery is the second battery with low charging efficiency, the charging speed of the battery can be improved by increasing the generated electric power of the electric power generator. Accordingly, regardless of whether the user installs the first battery including the lithium ion battery as the rechargeable battery or the second battery in the vehicle, damage to the battery and insufficient charge amount of the battery can be prevented.

In the structure described above, preferably, the first battery includes a battery of a type that has a signal transmission unit capable of receiving an instruction from the controller and transmitting a specific signal to the controller, and the controller instructs the rechargeable battery to transmit the specific signal to the controller, determines that the first battery is installed as the rechargeable battery when receiving the specific signal, and determines that the second battery is installed as the rechargeable battery when not receiving the specific signal.

According to this structure, whether the rechargeable battery is the first battery or the second battery can be determined appropriately and easily based on the signal output from the rechargeable battery.

In the structure described above, preferably, the controller determines whether the first battery or the second battery is installed in the vehicle as the rechargeable battery before the electric power generator starts electric power generation after an ignition switch is turned on.

According to this structure, from the start of charging the rechargeable battery by the electric power generator, the generated electric power of the electric power generator can be controlled to a voltage appropriate for the type of the rechargeable battery and damage to the rechargeable battery and insufficient charging amount of the battery can be reliably prevented.

In a structure other than the above, preferably, the controller has a current information reception unit capable of receiving information about a current flowing through the rechargeable battery and determines whether the rechargeable battery is the first battery or the second battery based on the information received by the current information reception unit when the rechargeable battery is charged.

This structure can also appropriately determine whether the rechargeable battery is the first battery based on the information about the current received by the current information reception unit.

In the structure described above, preferably, the controller determines whether the current flowing through the rechargeable battery when the rechargeable battery is charged exceeds a predetermined criteria current based on the information received by the current information reception unit and determines that the rechargeable battery is the first battery when the current exceeds the criteria current or determines that the rechargeable battery is the second battery in the other case.

According to this structure, it is possible to appropriately determine whether the rechargeable battery is the first battery by using the fact that the current flowing through the battery when charged is higher in the first battery with high charging efficiency than in the second battery with low charging efficiency.

As described above, according to the vehicle battery system according to the present disclosure, it is possible to prevent damage to the battery and insufficient charge amount of the battery regardless of the type of the battery installed.

OVERALL STRUCTURE OF VEHICLE

Figure 1:
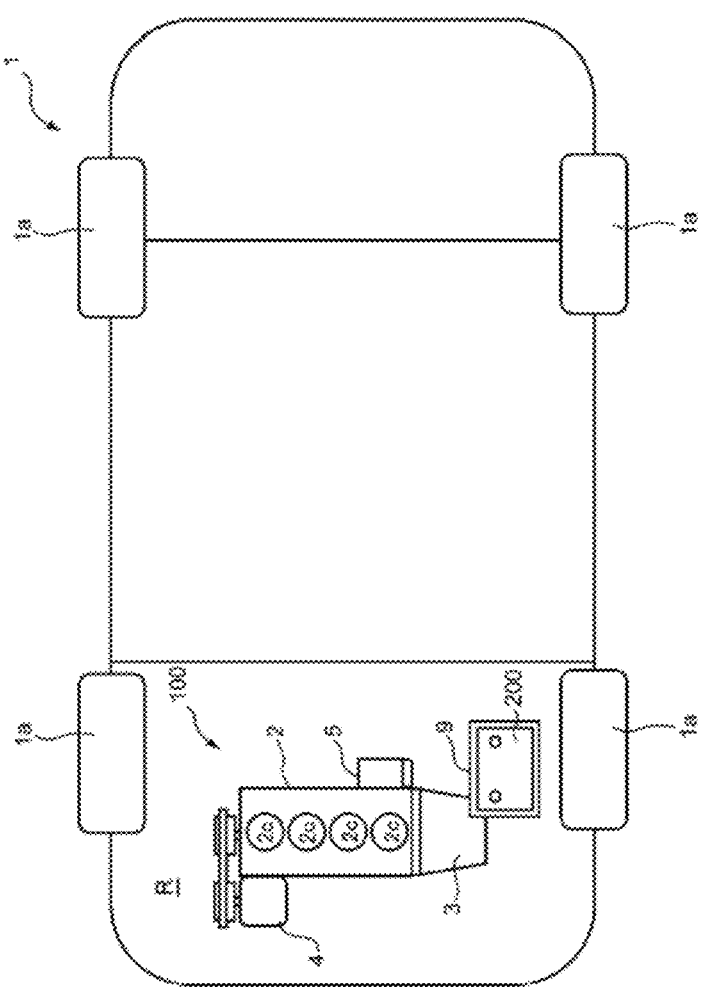
FIG. 1 is a diagram schematically illustrating the structure of a vehicle equipped with a vehicle battery system according to an embodiment of the present disclosure.

FIG. 1 is a diagram schematically illustrating the structure of a vehicle 1 equipped with a vehicle battery system 100 according to an embodiment of the present disclosure. The vehicle 1 includes an engine 2, a transmission 3, an alternator 4, a starter 5, and a rechargeable battery 200.

In the example in FIG. 1, the engine 2 is an in-line 4-cylinder engine with four cylinders 2c arranged in a row. In the embodiment, the engine 2 is driven by fuel including gasoline. The engine 2 has injectors 11 (see FIG. 4) that inject fuel into the cylinders 2c and spark plugs 12 (see FIG. 4) that ignite the air-fuel mixture (mixture of air and fuel) in the cylinders 2c. One injector 11 and one spark plug 12 are provided for each of the cylinders 2c. The engine 2 is installed in an engine room R provided in the front portion of the vehicle 1, as a drive source for the vehicle. The vehicle 1 is, for example, a four-wheeled vehicle and the driving force of the engine 2 is transmitted from the crankshaft to wheels 1a via the transmission 3, a final reduction gear, a drive shaft, and the like.

The alternator 4 is coupled to the crankshaft of the engine 2 via a belt and the like, rotationally driven by the crankshaft, and generates electric power. This alternator 4 can correspond to an electric power generator. In the embodiment, the alternator 4 is configured to perform so-called deceleration regeneration, which converts the rotational energy of the engine 2 into electric power when the vehicle decelerates.

The starter 5 is a device for starting the engine 2. The starter 5 rotates the crankshaft of the engine 2 when the driver turns on an IG switch (ignition switch) SW1 (see FIG. 4) installed in the vehicle 1 to start the engine 2.

The rechargeable battery 200 is charged by receiving electric power from the alternator 4. The rechargeable battery 200 is electrically connected to various types of auxiliary equipment provided in the vehicle 1, such as the injectors 11, the spark plugs 12, and the starter 5, and supplies electric power to these devices. The rechargeable battery 200 is placed on the battery mount portion 9 provided in the engine room R. The battery mount portion 9 is provided in a position easily accessed from outside the vehicle. In the illustrated example, the battery mount portion 9 is provided in an upper portion of the engine room R so that the user can easily place the rechargeable battery 200 on the battery mount portion 9 from above the engine room R.

The battery mount portion 9 is configured so that a first battery (referred to below as a Li battery) including a lithium ion battery or a lead battery can be used as the rechargeable battery 200. Specifically, the vehicle 1 is equipped with the Li battery when the vehicle 1 is shipped. However, when the Li battery is replaced due to degradation or the like of the Li battery, the user may place a lead battery with the same nominal voltage as the Li battery on the battery mount portion 9 instead of the Li battery. To address such a situation, the battery mount portion 9 of the vehicle 1 is configured so that the lead battery can be installed even when the lead battery is prepared as the rechargeable battery 200 instead of the Li battery. It should be noted here that the nominal voltage of a battery that can be used as the rechargeable battery 200 is, for example, 12V. This lead battery can correspond to a second battery.

Figure 2:
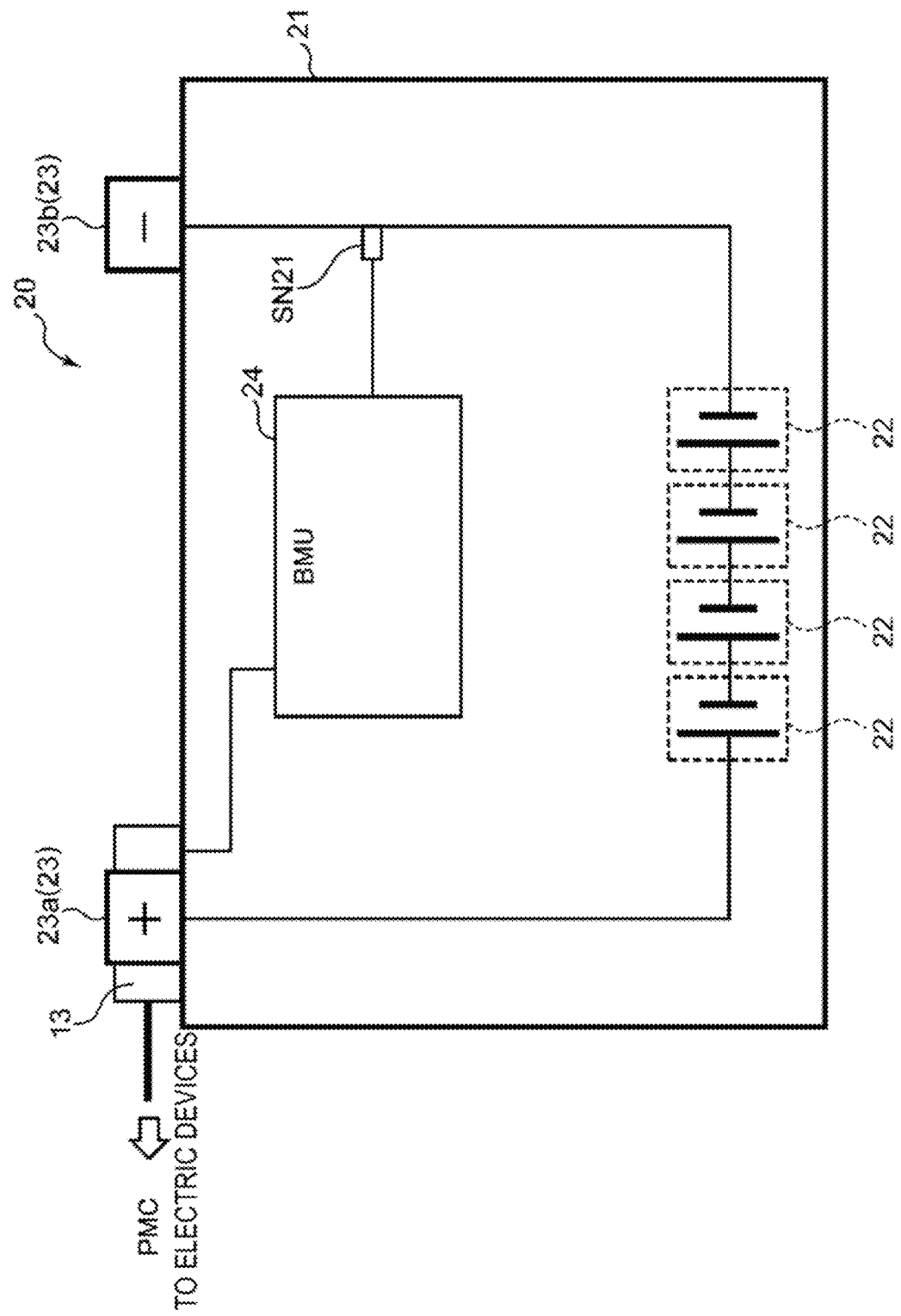
FIG. 2 is a diagram schematically illustrating the structure of a Li battery.

FIG. 2 is a schematic diagram used to describe the structure of a Li battery 20. The Li battery 20 contains lithium in the positive electrode and is charged and discharged by the movement of lithium ions between the positive electrode and the negative electrode. The Li battery 20 includes a box-shaped battery case 21, battery cells 22 housed in the battery case 21, and a pair of external terminals 23 (a positive electrode terminal 23a and a negative electrode terminal 23b) provided on the outer surface of the battery case 21. In the embodiment, the Li battery 20 has a plurality of (four in the example in the drawing) battery cells 22. These battery cells 22 are connected in series.

The battery case 21 further includes a Li battery current sensor SN21 and a BMU (battery management unit) 24.

The Li battery current sensor SN21 detects the current flowing through the Li battery 20. The BMU 24 is a device for managing the Li battery 20. The BMU 24 includes a microprocessor having a well-known CPU, ROM, RAM, and the like. The BMU 24 calculates the charge amount of the Li battery 20 based on the detection value from the Li battery current sensor SN21 and the like.

Figure 3:
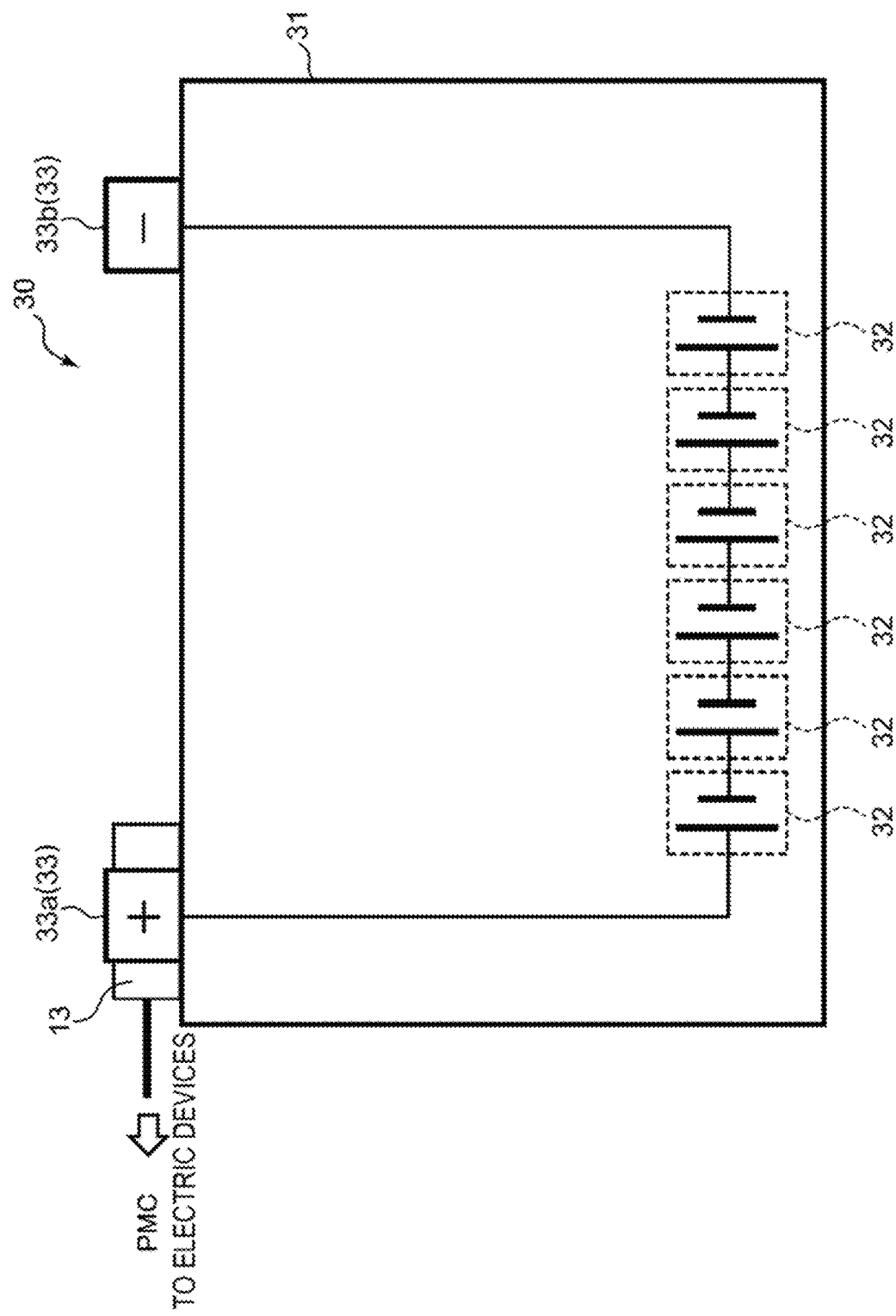
FIG. 3 is a diagram schematically illustrating the structure of a lead battery.

FIG. 3 is a schematic diagram used to describe the structure of the lead battery 30. The lead battery 30 contains lead in the positive electrode and the negative electrode, uses dilute sulfuric acid as the electrolytic solution, and is charged and discharged by the movement of sulfate ions between the electrodes and the electrolytic solution. Almost the same as the Li battery 20, the lead battery 30 also has a box-shaped battery case 31, battery cells 32 housed in the battery case 31, and a pair of external terminals 33 (a positive electrode terminal 33a and a negative electrode terminal 33b) provided on the outer surface of the battery case 31. In the embodiment, the lead battery 30 has a plurality of (six in the example in the drawing) battery cells 32 connected in series.

The vehicle 1 is provided with a connector 13 attached to the rechargeable battery 200. The rechargeable battery 200 and individual devices such as the alternator 4 are electrically connected to each other via the connector 13 and a harness extending from the connector 13. The connector 13 is configured so as to be fitted to both the Li battery 20 and the lead battery 30. For example, the connector 13 is fitted to the positive electrode terminals 23a and 33a of the batteries 20 and 30. It should be noted here that the negative electrode terminals 23b and 33b of the batteries 20 and 30 are connected to the vehicle body (ground).

(Characteristics of Batteries)

Figure 4:
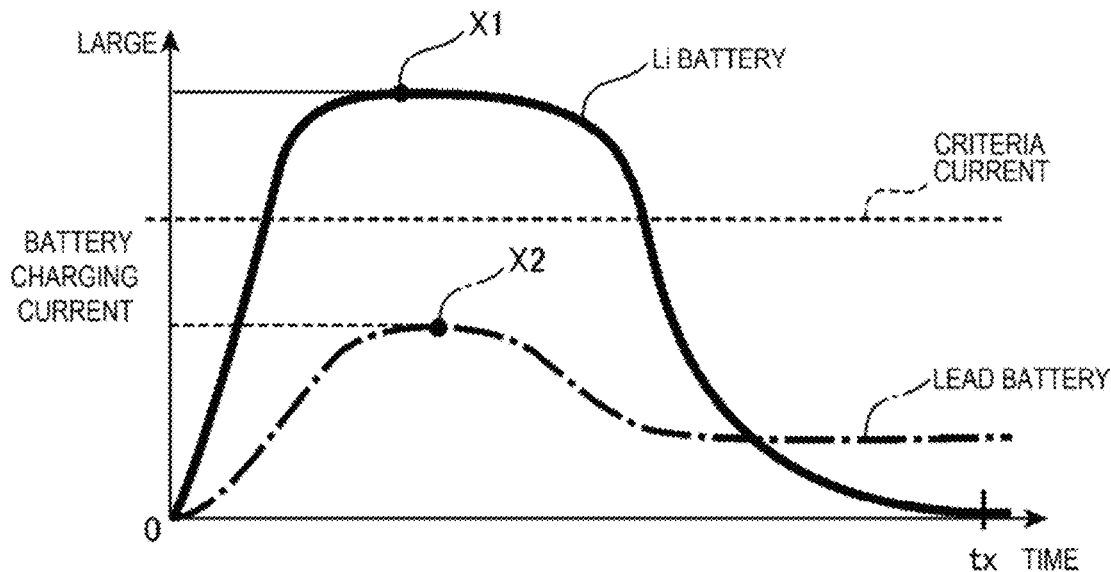
FIG. 4 is a diagram illustrating the comparison of the charging current between the Li battery and the lead battery.

FIG. 4 is a graph illustrating the comparison of the charging current (current flowing through the battery at the time of charging) when the Li battery 20 and the lead battery 30 with the same nominal voltage are charged by the same voltage. The horizontal axis of the graph in FIG. 4 represents the time after the start of charging and the vertical axis represents the charging current.

As illustrated in FIG. 4, the charging current of the Li battery 20 increases faster than that of the lead battery 30 immediately after the start of charging. In addition, the maximum value (X1) of the charging current of the Li battery 20 is larger than the maximum value (X2) of the charging current of the lead battery 30. In the Li battery 20, the battery is fully charged at time tx and the charging current drops to approximately zero. In contrast, the lead battery 30 continues to be charged even after time tx. Accordingly, the charging time of the Li battery 20 is shorter than that of the lead battery 30. As described above, the charging efficiency is different between the Li battery 20 and the lead battery 30 and the charging efficiency of the Li battery is higher than that of the lead battery 30.

(Control System)

Figure 5:
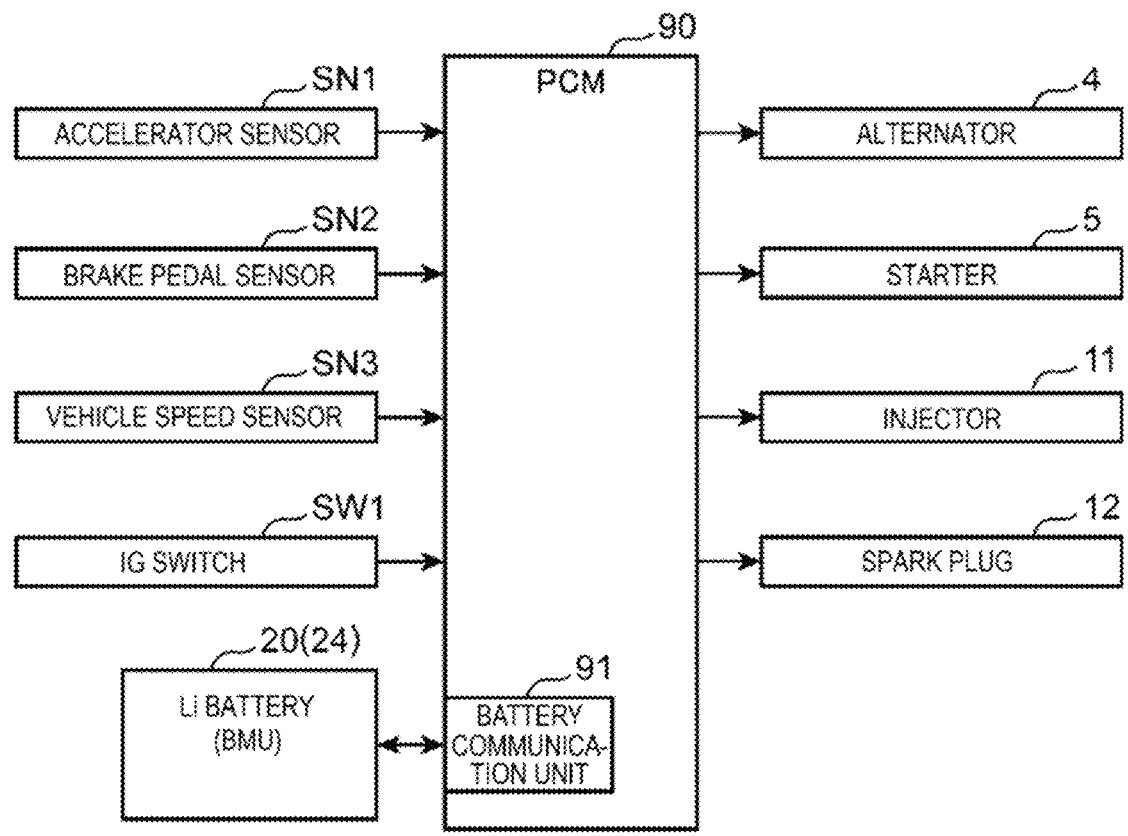
FIG. 5 is a block diagram illustrating a control system of the vehicle when the Li battery is installed.
Figure 6:
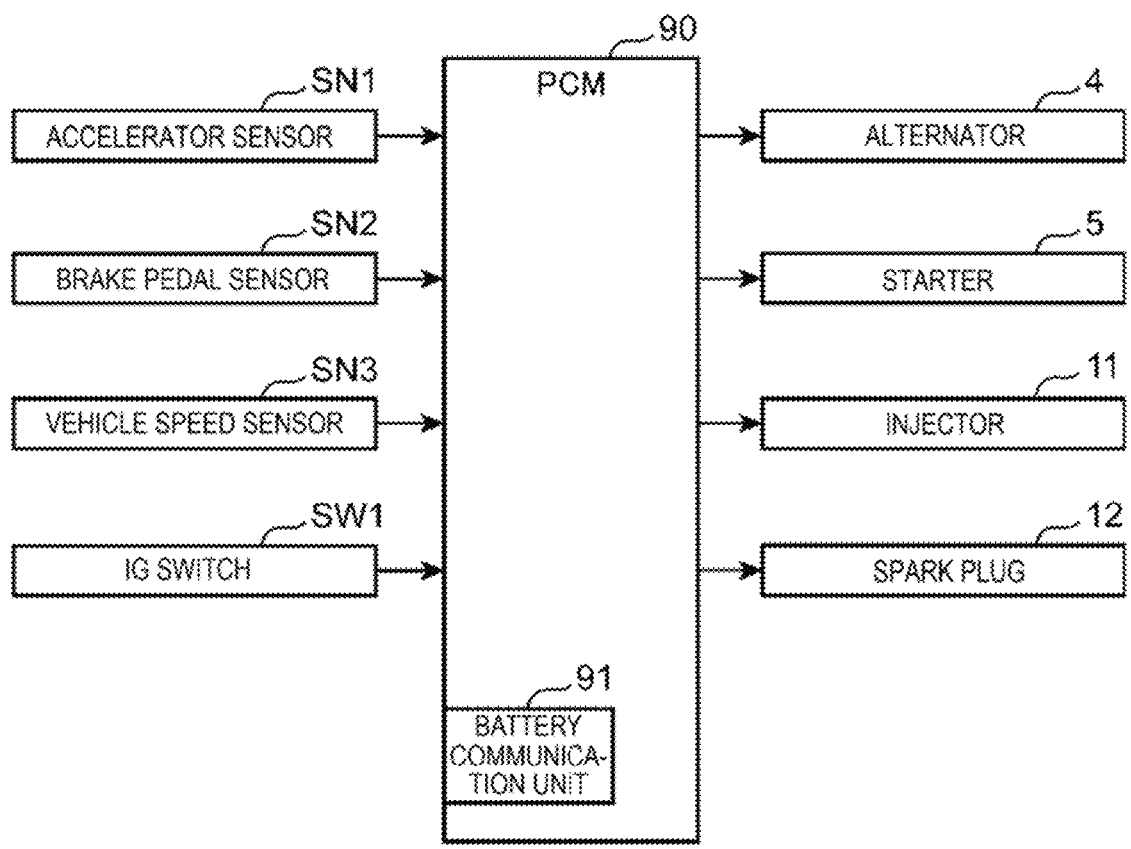
FIG. 6 is a block diagram illustrating the control system of the vehicle.

FIGS. 5 and 6 are block diagrams illustrating the control system of the vehicle 1. FIG. 5 is a block diagram when the rechargeable battery 200 is the Li battery 20 and FIG. 6 is a block diagram when the rechargeable battery 200 is the lead battery 30. The vehicle 1 is equipped with a PCM 90 for comprehensively controlling the entire vehicle. The PCM 90 is a microprocessor including a well-known CPU, ROM, RAM, and the like. This PCM 90 can correspond to a controller.

The PCM 90 receives signals from various sensors provided in the vehicle 1. For example, the PCM 90 receives detection values from an accelerator sensor SN1 for detecting the opening of the accelerator pedal, a brake pedal sensor SN2 for detecting the amount of depression of the brake pedal, a vehicle speed sensor SN3 for detecting the vehicle speed, and the like. The PCM 90 controls individual portions of the engine 2, such as the injectors 11 and the spark plugs 12, based on the detection values from these sensors SN1 to SN3 and drives the vehicle 1.

The PCM 90 is electrically connected to the starter 5 and also electrically connected to the IG switch SW1. When the IG switch SW1 is turned on, the PCM 90 receives this operation signal and rotationally drives the starter 5.

The PCM 90 is electrically connected to the alternator 4 and drives or stops the alternator 4. In addition, as described later, the PCM 90 determines the maximum generated power voltage, which is the upper limit value of the generated power voltage of the alternator 4, and controls alternator 4 so that the generated power voltage of the alternator 4 is equal to or less than this maximum generated power voltage.

The PCM 90 is electrically connected to the rechargeable battery 200 and operates by receiving electric power from the rechargeable battery 200.

In addition, the PCM 90 is provided with a battery communication unit 91 that exchanges signals with the BMU 24 of the Li battery 20. In the embodiment, by attaching the connector 13 to the Li battery 20 when the rechargeable battery 200 is the Li battery 20, the battery communication unit 91 (eventually the PCM 90) and the BMU 24 are communicably connected to each other. This battery communication unit 91 can correspond to a current information reception unit.

The BMU 24 transmits information such as the detection value from the Li battery current sensor SN21 (that is, the current value flowing through the Li battery 20) and the calculated charge amount of the Li battery 20 to the PCM 90 (battery communication unit 91).

In addition, in the embodiment, the BMU 24 can output a specific signal having been preset to notify the identification of the Li battery 20 and, when receiving an instruction for outputting this specific signal from the PCM 90, transmits the specific signal to the PCM 90. In the following, this specific signal is referred to as the Li battery signal as appropriate. In addition, in the embodiment, the BMU 24 that transmits this Li battery signal to the PCM 90 can correspond to a signal transmission unit.

It should be noted here that the lead battery 30 is not communicable with the battery communication unit 91 and, when the lead battery 30 is installed in the vehicle 1 as the rechargeable battery 200 and the connector 13 is attached to the lead battery 30, no signal is input to the communication unit 91.

(Determination of Battery and Control of Generated Power Voltage)

As described above, the electric power generation efficiency of the Li battery 20 is high. Accordingly, if the generated power voltage of the alternator 4 is high when the rechargeable battery 200 is the Li battery 20, the Li battery 20 may be overcharged and damaged. Therefore, when the rechargeable battery 200 is the Li battery 20, the generated electric power of the alternator 4 is desirably reduced. In contrast, the electric power generation efficiency of the lead battery 30 is low. Accordingly, if the generated power voltage of the alternator 4 is low when the rechargeable battery 200 is the lead battery 30, the charging speed of the lead battery 30 becomes very slow and the charge amount may not be obtained. Accordingly, when the rechargeable battery 200 is the lead battery 30, the generated electric power of the alternator 4 is desirably increased. As described above, the desired value of the generated electric power of the alternator 4 at the time of charging differs between the Li battery 20 and the lead battery 30. Accordingly, the PCM 90 determines whether the Li battery 20 or the lead battery 30 is installed in the vehicle 1 as the rechargeable battery 200 and controls the generated power voltage of the alternator 4 to an appropriate voltage corresponding to the type of the battery.

First Embodiment

Figure 7:
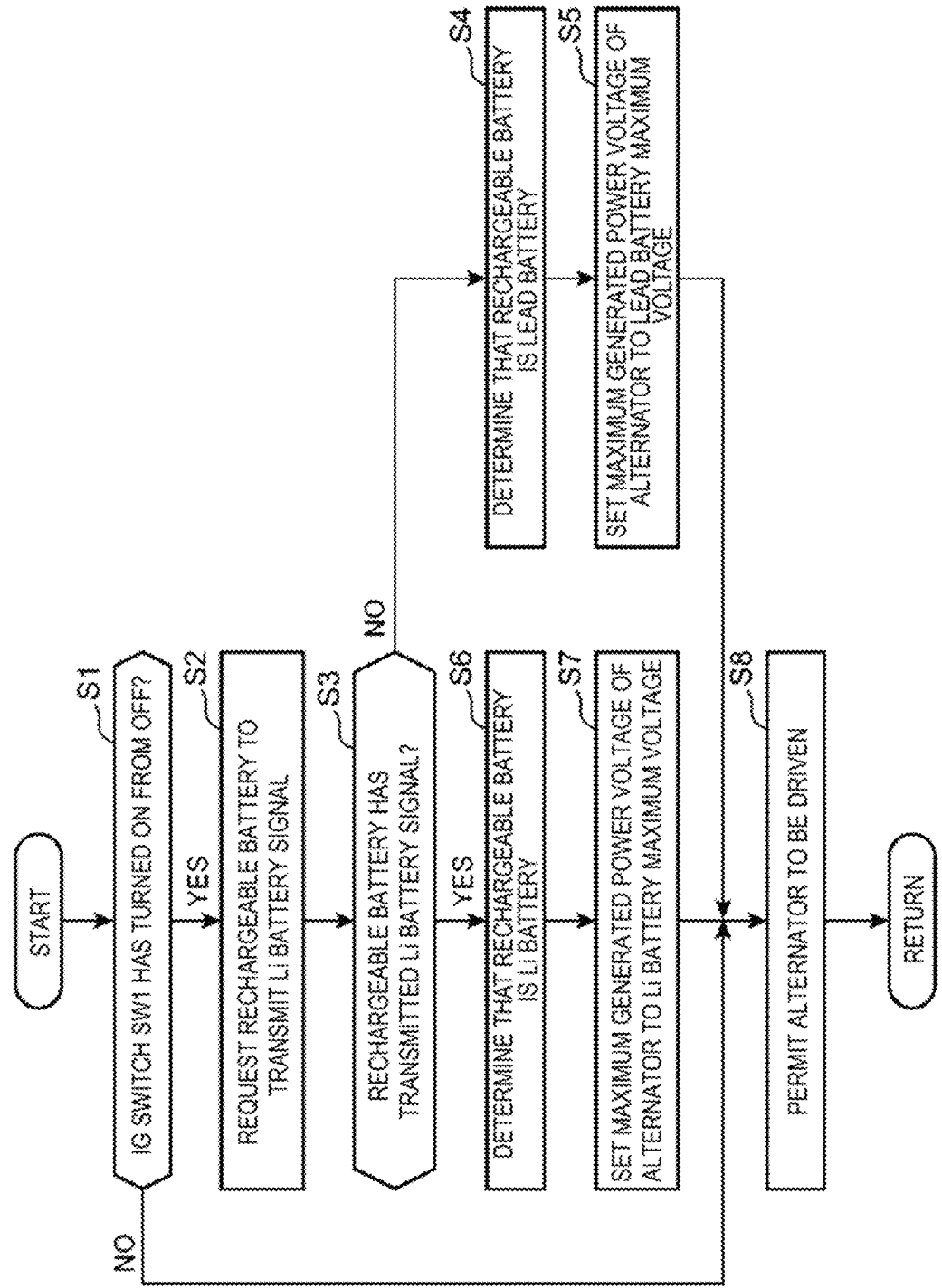
FIG. 7 is a flowchart illustrating the procedure for determining a battery and the procedure for controlling an alternator according to a first embodiment.

The determination and the control procedure of the generated power voltage of the alternator 4 according to the first embodiment will be described with reference to the flowchart in FIG. 7.

First, in step S1, the PCM 90 determines whether the IG switch SW1 has been turned on from off. When the determination in step S1 is NO, that is, when the IG switch SW1 remains off, the PCM 90 ends the processing without performing the subsequent steps (returns to step S1). In contrast, when the determination in step S1 is YES, that is, when the IG switch SW1 has been turned on from off, the PCM 90 proceeds to step S2. That is, step S2 and the subsequent steps are started when the IG switch SW1 has been turned on from off.

In step S2, the PCM 90 instructs the rechargeable battery 200 to transmit the Li battery signal to the PCM 90 via the battery communication unit 91. Next, in step S3, the PCM 90 determines whether the rechargeable battery 200 has transmitted the Li battery signal.

As described above, the PCM 90 can communicate with the BMU 24 of the Li battery 20 via the battery communication unit 91 and the BMU 24 transmits the Li battery signal to the PCM 90 (battery communication unit 91) when receiving an instruction from the PCM 90. In contrast, the lead battery 30 cannot communicate with the battery communication unit 91 and the PCM 90 and no signal is transmitted from the lead battery 30 to the PCM 90 (battery communication unit 91).

Accordingly, when the determination in step S3 is YES and the Li battery signal has been transmitted from the rechargeable battery 200, that is, when the battery communication unit 91 has received the Li battery signal, the PCM 90 determines that the rechargeable battery 200 is the Li battery 20 in step S6. In step S7 after step S6, the PCM 90 sets the maximum generated power voltage of the alternator 4 to the Li battery maximum voltage. The Li battery maximum voltage is preset and stored in the PCM 90. The Li battery maximum voltage is set to, for example, 14.0 V. After step S7, the processing proceeds to step S8.

In contrast, when the determination in step S3 is NO and it is determined that the Li battery signal has not been transmitted from the rechargeable battery 200, that is, when the battery communication unit 91 has not received the Li battery signal, the PCM 90 determines in step S4 that the rechargeable battery 200 is the lead battery 30. In step S5 after step S4, the PCM 90 sets the maximum generated power voltage of the alternator 4 to the lead battery maximum voltage higher than the Li battery maximum voltage. The lead battery maximum voltage is preset and stored in the PCM 90. The Li battery maximum voltage is set to, for example, 14.4 V. After step S5, the processing proceeds to step S8.

In step S8, the PCM 90 permits the driving of the alternator 4. That is, when the determination in step S1 is YES and the IG switch SW1 has been turned on from off, the driving of the alternator 4 is prohibited until steps S2 to S8 are executed, a determination as to whether the rechargeable battery 200 is the Li battery 20 or the lead battery 30 is made, and the maximum generated power voltage of the alternator 4 is set based on this determination. Only after the determination and the setting are made, the driving of the alternator 4 is permitted. In other words, the determination and the setting described above are made before the alternator 4 is driven after the IG switch SW1 is turned on.

Figure 8:
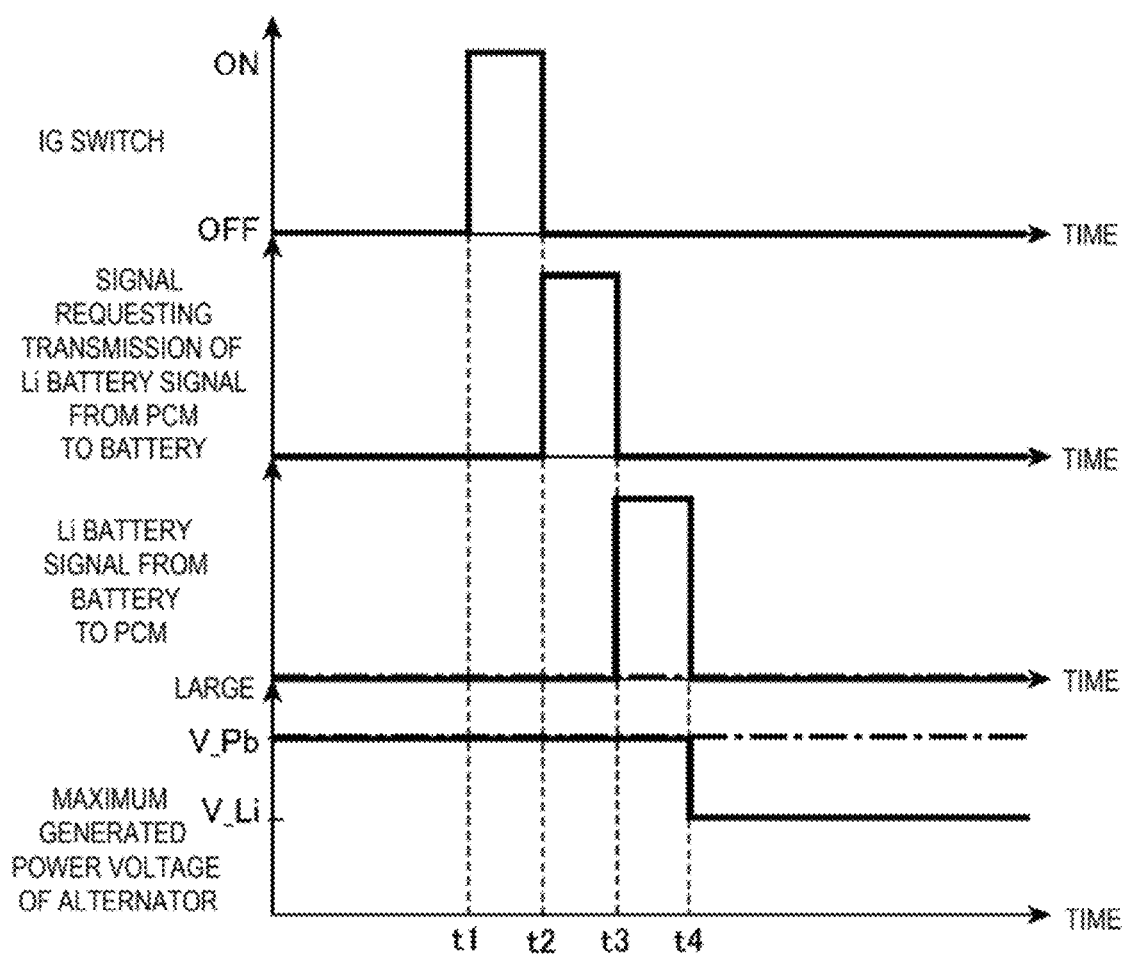
FIG. 8 is a time chart used to describe the procedure for determining the battery and the procedure for controlling the alternator according to the first embodiment.

FIG. 8 schematically illustrates the changes in individual parameters when the above control is performed. FIG. 8 shows an example in which the IG switch SW1 is turned on from off at time t1 when the rechargeable battery 200 is determined to be the lead battery 30 and the maximum generated power voltage of the alternator 4 is set to a lead battery maximum voltage V_Pb.

When the IG switch SW1 is turned on at time t1, the PCM 90 (battery communication unit 91) outputs a signal requesting the transmission of the Li battery signal to the rechargeable battery 200 at time t2 after time t1.

At this time, when the rechargeable battery 200 is the Li battery 20, the Li battery 20 (BMU 24) receives this request signal and transmits the Li battery signal to the PCM 90 (battery communication unit 91) at time t3 as illustrated by the solid line. Then, when receiving the Li battery signal, the PCM 90 determines that the rechargeable battery 200 is the Li battery 20 and sets the maximum generated power voltage of the alternator 4 to a Li battery generated power voltage V_Li at time t4 as illustrated by the solid line.

In contrast, when the rechargeable battery 200 is the lead battery 30, the rechargeable battery 200 does not receive the request signal from the PCM 90 (battery communication unit 91) and does not transmit the Li battery signal to PCM 90 at time t3 as illustrated by the dot-dash line. Accordingly, the PCM 90 determines that the rechargeable battery 200 is the lead battery 30 and sets (maintains) the maximum generated power voltage of the alternator 4 to the lead battery generated power voltage V_Pt at time t4 as illustrated by the dot-dash line.

Operation and the Like of First Embodiment

Since both the Li battery 20 and the lead battery 30 can be used as the rechargeable battery 200 in the embodiment as described above, a highly convenient vehicle can be provided. However, the charging efficiency is different between the Li battery 20 and the lead battery 30. Accordingly, it is determined whether the rechargeable battery 200 is the Li battery 20 or the lead battery 30. When the rechargeable battery 200 is the Li battery 20 with high charging efficiency, the maximum generated power voltage of the alternator 4 is reduced. Accordingly, it is possible to prevent excessive electric power from being supplied from the alternator 4 to the Li battery 20 and prevent the Li battery 20 from being overcharged and failed. Alternatively, when the rechargeable battery 200 is the lead battery 30 with low charging efficiency, the maximum generated power voltage of the alternator 4 is increased. Accordingly, the lead battery 30 can be early charged by increasing the generated power voltage of the alternator and the charge amount of the lead battery 30 (that is, the rechargeable battery 200) can be obtained.

In particular, since the Li battery signal output from the BMU 24 of the Li battery 20 is used to determine whether the rechargeable battery 200 is the Li battery 20 or the lead battery 30 in the first embodiment, this determination can be made appropriately and easily.

Moreover, this determination method does not need to drive the alternator 4 for the determination described above. Accordingly, in the embodiment described above, the determination concerning the rechargeable battery 200 is made before the driving of the alternator 4 is started after the IG switch SW1 is turned on. Therefore, from the start of charging the rechargeable battery 200 by the alternator 4, the generated electric power of the alternator 4 can be set to an appropriate voltage according to the type of the rechargeable battery 200, thereby preventing the failure and insufficient charge amount of the rechargeable battery 200 more reliably.

Second Embodiment

Next, the determination procedure for determining whether the rechargeable battery 200 is the Li battery 20 or the lead battery 30 according to a second embodiment will be described. Since the structure other than this battery determination procedure is the same as that in the first embodiment in the second embodiment, only the battery determination procedure will be described below.

Figure 9:
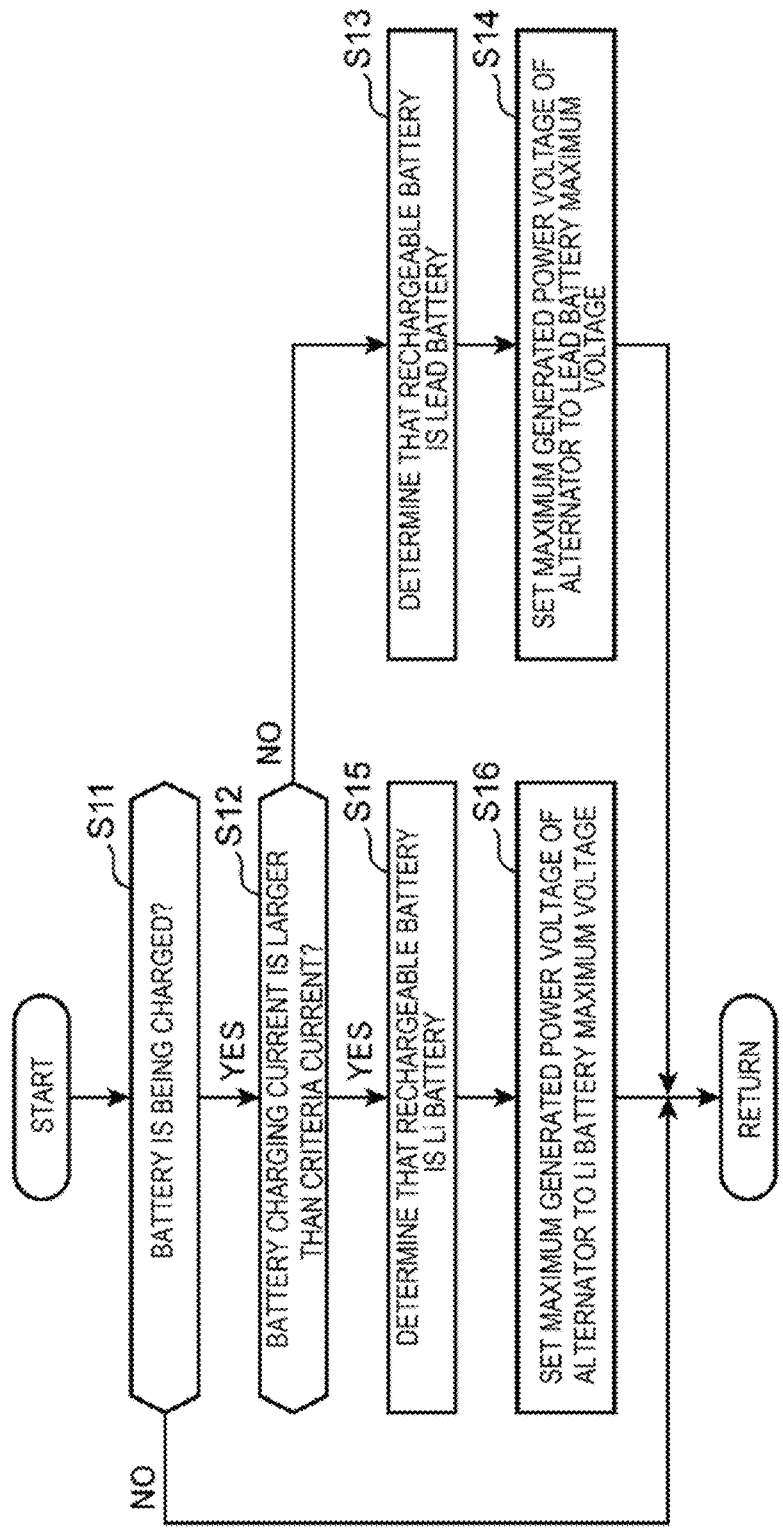
FIG. 9 is a flowchart illustrating the procedure for determining a battery and the procedure for controlling an alternator according to a second embodiment.

FIG. 9 is a flowchart illustrating the battery determination procedure according to the second embodiment.

First, in step S11, the PCM 90 determines whether the rechargeable battery 200 is being charged. Specifically, the PCM 90 determines whether the execution conditions of deceleration regeneration are satisfied based on the accelerator opening and the like and, when these conditions are satisfied, charges the rechargeable battery 200 by starting electric power generation by the alternator 4. Accordingly, in the second embodiment, the PCM 90 determines that the rechargeable battery 200 is being charged when the execution conditions of deceleration regeneration are satisfied.

When the determination in step S11 is NO, that is, when the rechargeable battery 200 is not being charged, the PCM 90 ends the processing (returns to step S1) without performing any operation.

In contrast, when the determination in step S11 is the YES, that is, when the rechargeable battery 200 is being charged, the processing proceeds to step S12 and the PCM 90 determines whether the charging current, which is the current flowing through the rechargeable battery 200, has exceeded a preset determination current.

Specifically, in step S12, the PCM 90 determines whether the charging current has exceeded the criteria current before a predetermined period elapses after the charging of the rechargeable battery 200 is started. As illustrated in FIG. 4, the criteria current is lower than the maximum value X1 of the charging current of the rechargeable battery 200 when the rechargeable battery 200 is the Li battery 20 and higher than the maximum value X2 of the charging current of the rechargeable battery 200 when the rechargeable battery 200 is the lead battery 30. In the embodiment, the criteria current is preset and stored in the PCM 90. In addition, the predetermined period is set to a period longer than the period until the charging current is maximized after charging is started in the Li battery 20 and the period until the charging current is maximized after charging is started in the lead battery 30. Accordingly, when the rechargeable battery 200 is the Li battery 20, the charging current of the rechargeable battery 200 exceeds the criteria current before the predetermined period elapses after the charging of the rechargeable battery 200 is started.

As describe above, when the rechargeable battery 200 is the Li battery 20, the value of the charging current of the Li battery 20 detected by the Li battery current sensor SN21 is transmitted to the PCM 90 via the BMU 24 and the battery communication unit 91. Accordingly, when the rechargeable battery 200 is the Li battery 20, the PCM 90 can detect that the charging current of the rechargeable battery 200 exceeds the criteria current.

Accordingly, when the determination in step S3 is YES and the charging current of the rechargeable battery 200 has exceeded the criteria current, the PCM 90 determines in step S15 that the rechargeable battery 200 is the Li battery 20. Then, in step S16, the PCM 90 sets the maximum generated power voltage of the alternator 4 to the Li battery generated power voltage V_Li.

In contrast, when the rechargeable battery 200 is the lead battery 30, the value of the current flowing through the rechargeable battery 200 is not transmitted to the PCM 90. Accordingly, the determination in step S3 cannot be YES. Accordingly, when the determination in step S3 is NO and it is not determined that the charging current of the rechargeable battery 200 has exceeded the criteria current, the processing proceeds to step S13 and the PCM 90 determines that the rechargeable battery 200 is the lead battery 30. Then, in step S14, the PCM 90 sets the maximum generated power voltage of the alternator 4 to the lead battery maximum voltage V_Lb.

Figure 10:
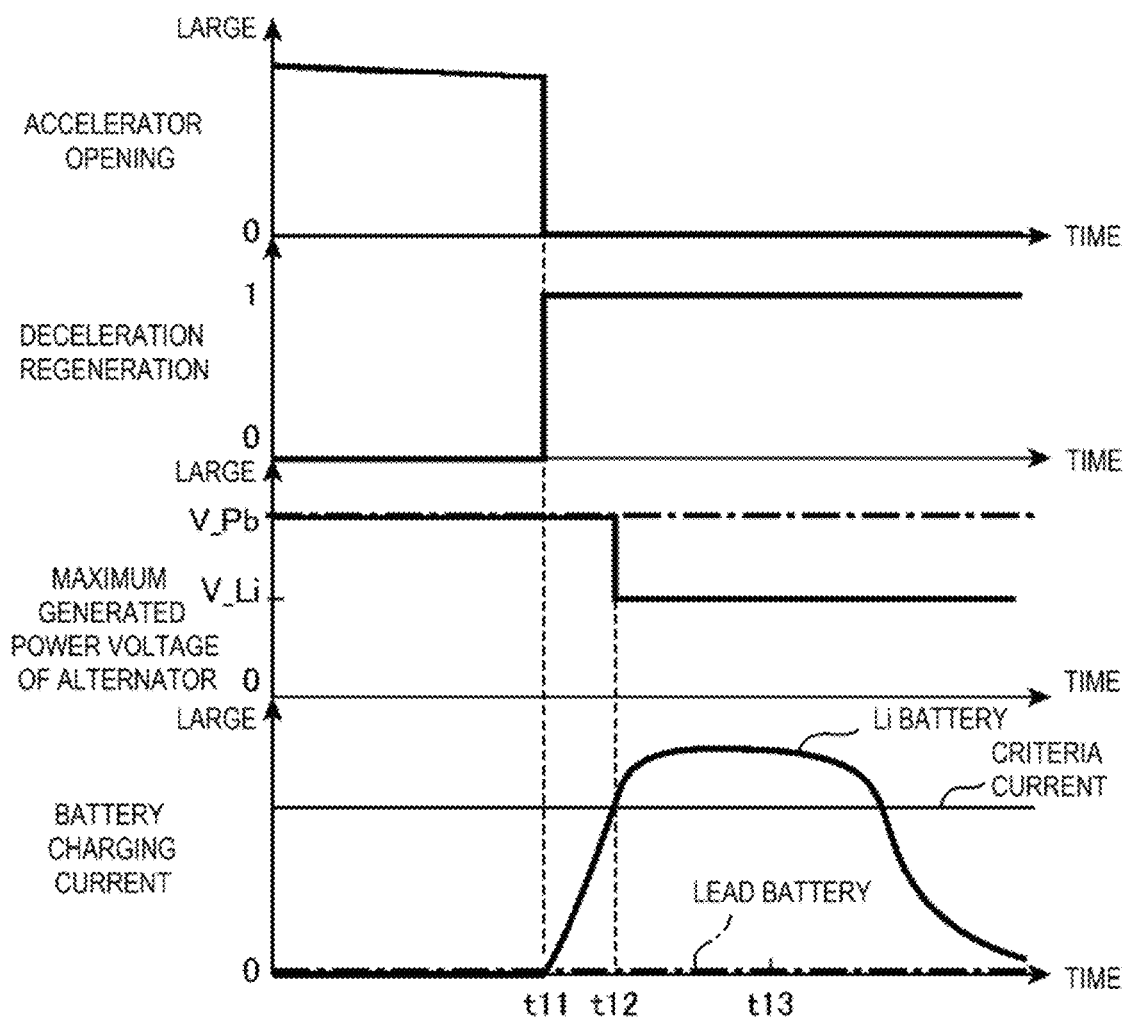
FIG. 10 is a time chart used to describe the procedure for determining the battery and the procedure for controlling the alternator according to the second embodiment.

The changes in individual parameters when the control according to the second embodiment is executed are schematically illustrated in FIG. 10. It should be noted here that FIG. 10 illustrates the changes when deceleration regeneration is started at time t11 in the state in which the rechargeable battery 200 is determined to be the lead battery 30 and the maximum voltage of the alternator 4 is set to the lead battery maximum voltage V_Pb.

When the execution conditions of deceleration regeneration including that the accelerator opening is zero and the like are satisfied, deceleration regeneration is started at time t11 and the electric power generation and the charging of the rechargeable battery 200 by the alternator 4 are started. It should be noted here that the second graph from the top in FIG. 10 represents the execution flag of deceleration regeneration, which is the flag indicating 1 during deceleration regeneration or 0 in the other case.

When the charging of the rechargeable battery 200 is started at time t11, the charging current of the rechargeable battery 200 increases. At this time, when the rechargeable battery 200 is the Li battery 20, the value of the charging current of the rechargeable battery 200 is transmitted from the rechargeable battery 200 to the PCM 90, and the PCM 90 detects that this charging current has exceeded the criteria current at a predetermined time t12 as illustrated by the solid line. Accordingly, the PCM 90 determines that the rechargeable battery 200 is the Li battery 20 and sets the maximum generated power voltage of the alternator 4 to the Li battery generated power voltage V_Li at time t12 as illustrated by the solid line.

In contrast, when the rechargeable battery 200 is the lead battery 30, the value of the charging current of the rechargeable battery 200 is not transmitted from the rechargeable battery 200 to the PCM 90 and the PCM 90 does not determine that the charging current of the rechargeable battery 200 has exceeded the criteria current within the predetermined period after the start of the charging of the rechargeable battery 200. For example, the PCM 90 recognizes the value of the charging current of the rechargeable battery 200 as zero, as illustrated by the dot-dash line in FIG. 10. Accordingly, at time t13 when the predetermined period has elapsed from the start of charging, the PCM 90 determines that the rechargeable battery 200 is the lead battery 30 and sets (maintains) the maximum generated power voltage of the alternator 4 to the Li battery generated power voltage V_Li.

Operation and the Like of Second Embodiment

As described above, in the second embodiment, when the charging current of the rechargeable battery 200 at the time of charging exceeds the criteria current, the rechargeable battery 200 is determined to be the Li battery 20. Otherwise, the rechargeable battery 200 is determined to be the lead battery 30. Since the charging efficiency of the Li battery 20 is higher than that of the lead battery 30 as described above, the charging current exceeds the criteria current when the rechargeable battery 200 is the Li battery 20 and the charging current does not exceed the criteria current when the rechargeable battery 200 is the lead battery 30. Accordingly, it is also possible to reliably determine whether the rechargeable battery 200 is the Li battery 20 or the lead battery 30 by the determination procedure according to the second embodiment.

(Modification)

Figure 11:
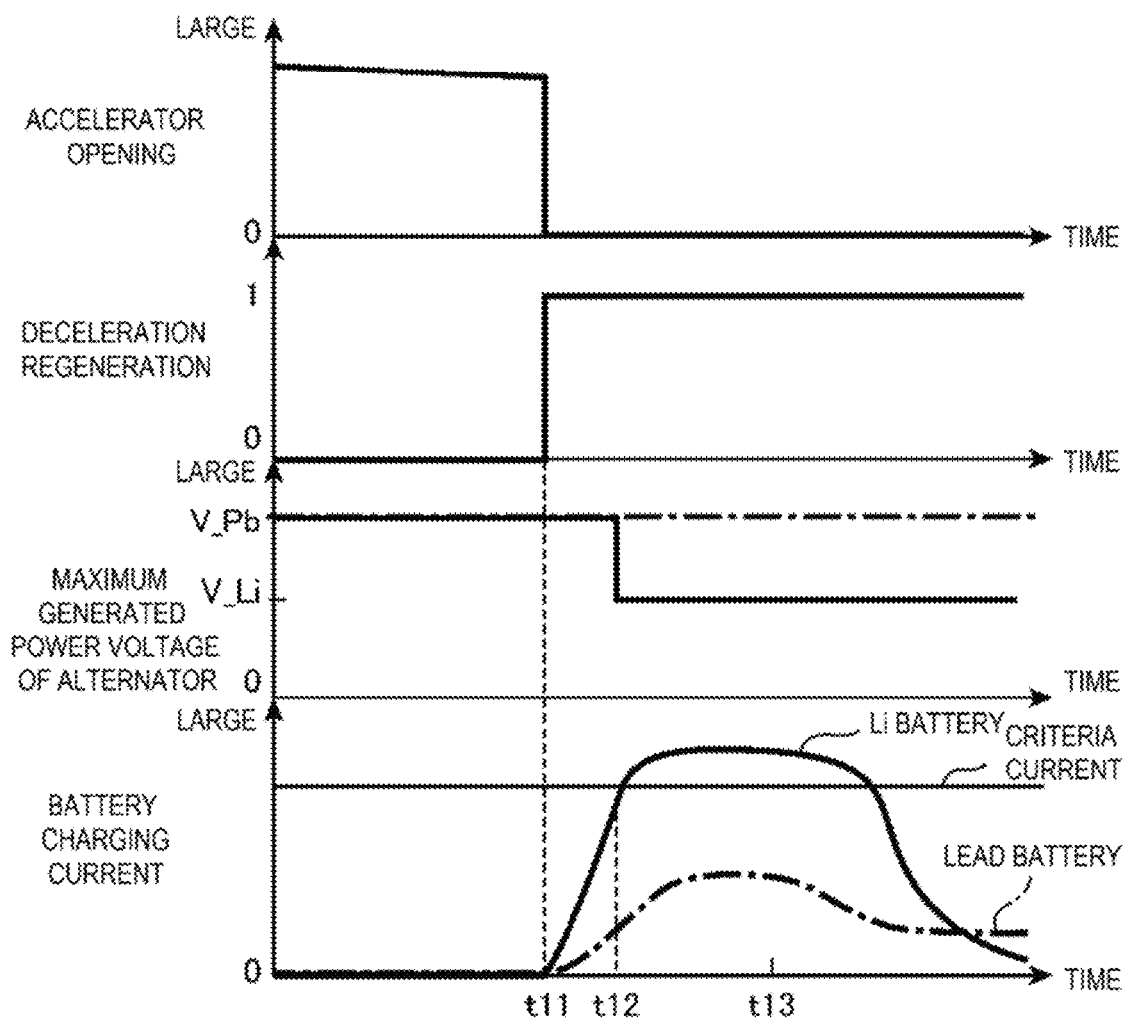
FIG. 11 is a time chart according to a modification of the second embodiment and corresponds to FIG. 10.

Although the case in which the PCM 90 cannot recognize the value of the current flowing through the lead battery 30 is described in the second embodiment, the PCM 90 may recognize the value of the current flowing through the lead battery 30. For example, a sensor that can detect the current flowing through the rechargeable battery 200 may be attached to the connector 201 or the like attached to the rechargeable battery 200 so that the current flowing through the rechargeable battery 200 is input to the PCM 90 regardless of whether the rechargeable battery 200 is the Li battery 20 or the lead battery 30. Even in such a structure, by setting the criteria current to a value larger than the maximum value of the charging current of the lead battery 30 and lower than the maximum value of the charging current of the Li battery 20, it is possible to appropriately determine whether the rechargeable battery 200 is the Li battery 20 or the lead battery 30 depending on whether the charging current of the rechargeable battery 200 at the time of charging exceeds the criteria current. Specifically, when the rechargeable battery 200 is the lead battery 30 in this structure, the charging current of the rechargeable battery 200 recognized by the PCM 90 is indicated by the dot-dash line in FIG. 11 and does not exceed the criteria current. Accordingly, the type of the rechargeable battery 200 is appropriately determined by the determination method according to the embodiment described above. That is, the rechargeable battery 200 is the Li battery 20 when the charging current exceeds the criteria current and the rechargeable battery 200 is the lead battery 30 in the other case (when the charging current does not exceed the criteria current).

In addition, although it is determined whether the rechargeable battery 200 is the Li battery 20 or the lead battery 30 depending on whether the charging current of the rechargeable battery 200 at the time of charging exceeds the criteria current in the second embodiment described above, instead of this, the determination may be made depending on whether the charge amount obtained by totalizing the charging current of the rechargeable battery 200 at the time of charging over a predetermined period, exceeds a predetermined value.

Figure 12:
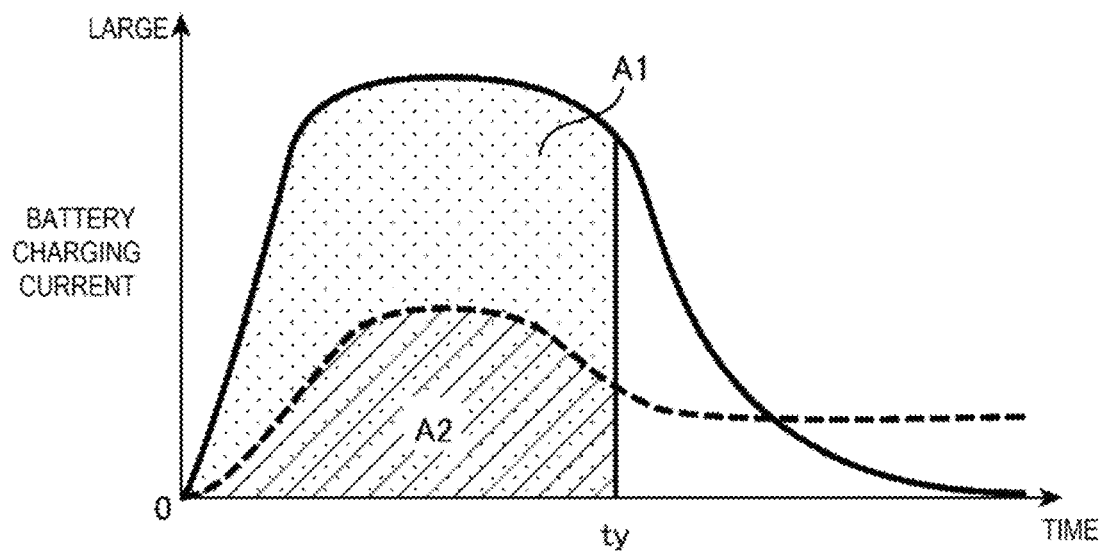
FIG. 12 is a diagram illustrating the comparison of the charge amount between the Li battery and the lead battery.

Specifically, since the charging efficiency of the Li battery 20 is higher than that of the lead battery 30, the charge amount (the total of the charge current of the Li battery 20 from the start of charging to a predetermined time ty) of the Li battery 20 indicated by the area of region A1 in FIG. 12 is larger than the charge amount (the total of the charging current of the lead battery 30 from the start of charging to the predetermined time ty) of the lead battery indicated by the area of region A2 in FIG. 12. Accordingly, by setting the predetermined value to a value larger than the charge amount of the lead battery 30 and lower than the charge amount of the Li battery 20, the charge amount of the rechargeable battery 200 exceeds the predetermined value when the rechargeable battery 200 is the Li battery 20 and the charge amount of the rechargeable battery 200 does not exceed the predetermined value in the other case. Therefore, it is possible to appropriately determine whether the rechargeable battery 200 is the Li battery 20 or the lead battery 30 by determining whether the charge amount of the rechargeable battery 200 exceeds the predetermined value.

In addition, although the lead battery 30 is illustrated as the second battery with charging efficiency lower than the Li battery 20 in the first embodiment and the second embodiment, the type of the second battery is not limited to the lead battery 30.

In addition, the rechargeable battery 200 only needs to be installed so as to be replaceable by the user and the installation location and installation structure are not limited to the example described above. For example, the rechargeable battery 200 may be installed in a luggage compartment or the like provided in the rear portion of the vehicle.

What is claimed is:

1. A vehicle battery system equipped with an electric power generator, the vehicle battery system comprising:
    a rechargeable battery configured to be charged by the electric power generator and supply electric power to auxiliary equipment of a vehicle, the rechargeable battery being installed in the vehicle in a replaceable manner; and
    a controller, wherein the controller includes circuitry configured to determine whether a first battery or a second battery with charging efficiency lower than the first battery is installed in the vehicle as the rechargeable battery and, in response to determining that the second battery is installed as the rechargeable battery, make a maximum generated power voltage that is the maximum value of a generated power voltage of the electric power generator higher than in a case determining that the first battery is installed,
    wherein the first battery includes a battery configured to receive an instruction from the controller and transmit a specific signal to the controller, and
    the circuitry is further configured to
        instruct the rechargeable battery to transmit the specific signal to the controller,
        determine that the first battery is installed as the rechargeable battery in response to receiving the specific signal, and
        determine that the second battery is installed as the rechargeable battery in response to not receiving the specific signal.

2. The vehicle battery system according to claim 1, wherein the first battery is a lithium ion battery.

3. The vehicle battery system according to claim 1, wherein the circuitry is further configured to determine whether the first battery or the second battery is installed in the vehicle as the rechargeable battery before the electric power generator starts electric power generation after an ignition switch is turned on.

4. The vehicle battery system according to claim 1, wherein the circuitry is further configured to receive information about a current flowing through the rechargeable battery and determine whether the rechargeable battery is the first battery or the second battery based on the information received in response to the rechargeable battery being charged.

5. The vehicle battery system according to claim 4, wherein the circuitry is further configured to determine whether the current flowing through the rechargeable battery in response to the rechargeable battery being charged exceeding a predetermined criteria current based on the information received and determine that the rechargeable battery is the first battery in response to the current exceeding the criteria current or determine that the rechargeable battery is the second battery in the other case.

6. The vehicle battery system according to claim 1, wherein the specific signal is preset to identify a lithium ion battery.

7. A vehicle battery system equipped with an electric power generator, the vehicle battery system comprising:
   a rechargeable battery configured to be charged by the electric power generator and supply electric power to auxiliary equipment of a vehicle, the rechargeable battery being installed in the vehicle in a replaceable manner; and
   a controller, wherein the controller includes circuitry configured to determine whether a first battery or a second battery with charging efficiency lower than the first battery is installed in the vehicle as the rechargeable battery and, in response to determining that the second battery is installed as the rechargeable battery, make a maximum generated power voltage that is the maximum value of a generated power voltage of the electric power generator higher than in a case determining that the first battery is installed,
   wherein the circuitry is further configured to receive information about a current flowing through the rechargeable battery and determine whether the rechargeable battery is the first battery or the second battery based on the information received in response to the rechargeable battery being charged,
   wherein the circuitry includes a current information reception unit corresponding to a battery communication unit configured to exchange signals with the first battery, wherein by attaching a connector to the first battery, the battery communication unit is communicably coupled with the first battery.

8. The vehicle battery system according to claim 7, wherein the second battery is not communicable with the battery communication unit and, in response to the second battery being installed in the vehicle as the rechargeable battery and the connector is attached to the second battery, no signal is input to the battery communication unit.

9. A vehicle, comprising:
   a vehicle battery system equipped with an electric power generator, the vehicle battery system including
      a rechargeable battery configured to be charged by the electric power generator and supply electric power to auxiliary equipment of a vehicle, the rechargeable battery being installed in the vehicle in a replaceable manner; and
      a controller, wherein the controller includes circuitry configured to determine whether a first battery or a second battery with charging efficiency lower than the first battery is installed in the vehicle as the rechargeable battery and, in response to determining that the second battery is installed as the rechargeable battery, make a maximum generated power voltage that is the maximum value of a generated power voltage of the electric power generator higher than in a case determining that the first battery is installed,
      wherein the first battery includes a battery configured to receive an instruction from the controller and transmit a specific signal to the controller, and
      the circuitry is further configured to
         instruct the rechargeable battery to transmit the specific signal to the controller,
         determine that the first battery is installed as the rechargeable battery in response to receiving the specific signal, and
         determine that the second battery is installed as the rechargeable battery in response to not receiving the specific signal.

10. The vehicle of claim 9, wherein the first battery is a lithium ion battery.

11. The vehicle of claim 9, wherein the circuitry is further configured to determine whether the first battery or the second battery is installed in the vehicle as the rechargeable battery before the electric power generator starts electric power generation after an ignition switch is turned on.

12. The vehicle of claim 9, wherein the circuitry is further configured to receive information about a current flowing through the rechargeable battery and determine whether the rechargeable battery is the first battery or the second battery based on the information received in response to the rechargeable battery being charged.

13. The vehicle of claim 12, wherein the circuitry is further configured to determine whether the current flowing through the rechargeable battery in response to the rechargeable battery being charged exceeding a predetermined criteria current based on the information received and determine that the rechargeable battery is the first battery in response to the current exceeding the criteria current or determine that the rechargeable battery is the second battery in the other case.

14. The vehicle of claim 12, wherein the circuitry includes a current information reception unit corresponding to a battery communication unit configured to exchange signals with the first battery, wherein by attaching a connector to the first battery, the battery communication unit is communicably coupled with the first battery.

15. The vehicle of claim 14, wherein the second battery is not communicable with the battery communication unit and, in response to the second battery being installed in the vehicle as the rechargeable battery and the connector is attached to the second battery, no signal is input to the battery communication unit.

16. The vehicle of claim 9, wherein the specific signal is preset to identify a lithium ion battery.

* * * * *